United States Patent [19]
Martinoli

[11] 3,799,618
[45] Mar. 26, 1974

[54] WHEEL BALANCING SYSTEMS
[76] Inventor: Sante Tino Martinoli, 6524 Santa Monica Blvd., Hollywood, Calif. 90038
[22] Filed: Sept. 14, 1971
[21] Appl. No.: 180,428

[52] U.S. Cl. ............................................. 301/5 B
[51] Int. Cl. ................................................ B60b 13/00
[58] Field of Search ................ 301/5 B, 5 BA, 5 R

[56] References Cited
UNITED STATES PATENTS

| | | |
|---|---|---|
| 734,417 | 7/1903 | Hubbell ........................... 301/5 B |
| 2,433,762 | 12/1947 | Kalajian ........................... 301/5 B |
| 3,177,039 | 4/1965 | Skidmore ......................... 301/5 B |
| 3,336,083 | 8/1967 | Chatain ............................ 301/5 B |
| 2,861,471 | 11/1958 | Kronenberg ..................... 301/5 B |
| 2,958,165 | 11/1960 | Hofmann .......................... 301/5 B |
| 3,017,224 | 1/1962 | Palmer .............................. 301/5 B |

FOREIGN PATENTS OR APPLICATIONS
627,995    6/1927    France ............................. 301/5 B

*Primary Examiner*—Richard J. Johnson
*Assistant Examiner*—Reinhard J. Eisenzopf
*Attorney, Agent, or Firm*—Bernard Kriegel

[57] ABSTRACT

A vehicle wheel balancing system in which one or more balance weights are secured to a circumferential rib disposed laterally inwardly from the inner face or inner perimeter of the wheel rim, each weight being readily positioned at a desired circumferential location on the rib and being easily mounted on and secured to the rib and easily removable from the rib.

8 Claims, 15 Drawing Figures

PATENTED MAR 26 1974 3,799,618

INVENTOR.
SANTE TINO MARTINOLI

BY Bernard Kriegel

ATTORNEY.

INVENTOR.
SANTE TINO MARTINOLI
BY Bernard Kriegel
ATTORNEY.

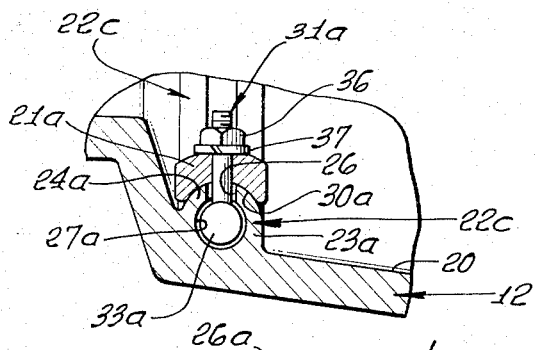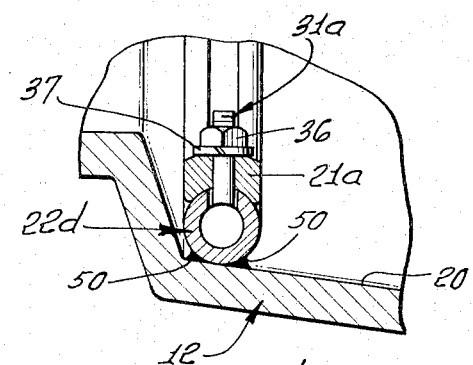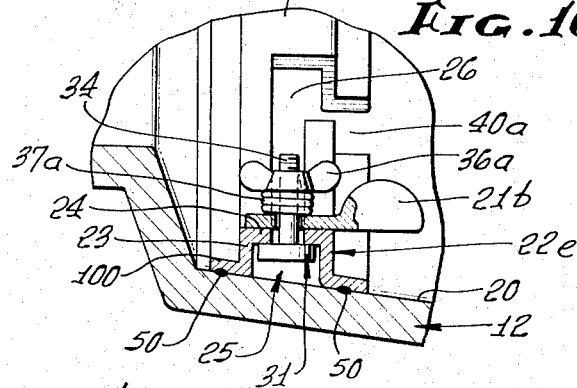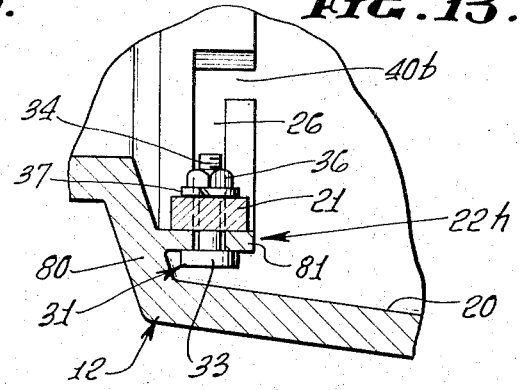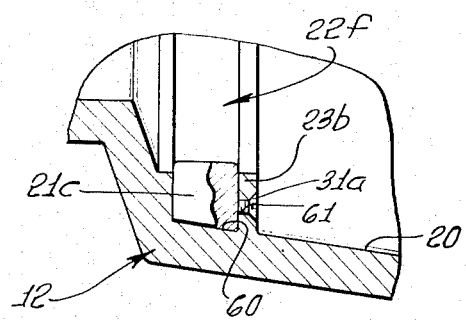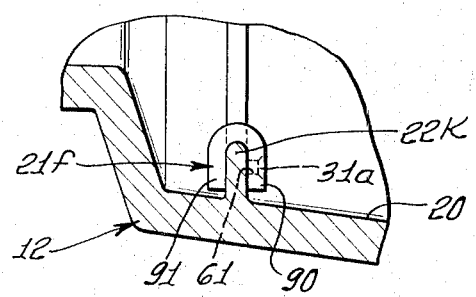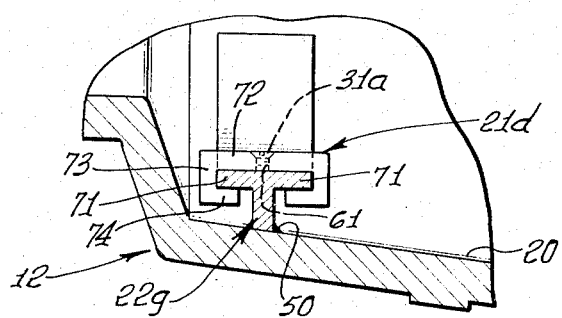

WHEEL BALANCING SYSTEMS

The present invention relates to wheel balancing, and more particularly to the balancing of vehicle wheels.

Vehicle wheels with pneumatic tires mounted thereon are usually balanced through use of lead or similar weights having clips attached to circumferential beads on the wheel rims. In lightweight wheels used on vehicles operable at high speeds, such as racing vehicles or sports cars, the shape of the wheel rim precludes such attachment of the balance weights. In such vehicles, balancing has been accomplished through the drilling and tapping of holes in the wheel rim and the securing of the weights to the rim by fastening elements extending through the weights and threaded in the holes. This arrangement imposes limitations on balancing of the wheels since the weights can be applied only at the location of the threaded holes. To obviate the difficulty noted, the balance weights have been applied adhesively to the inner circumferential surface of the wheel rim and at the desired circumferential locations, such as described in U.S. Pat. No. 3,154,347. However, the balance of the wheels is often lost, especially under high speed driving conditions, due to one or more of the weights flying off the rim, which might be due to stresses imposed on the weights and adhesive under driving conditions, and weakening of the adhesive occasioned by the high temperatures generated by the vehicle tire and brakes, which are transmitted through the wheel to the adhesive and weights mounted thereon. Such heat transmission is facilitated by the relatively high coefficient of heat transfer of magnesium and aluminum, the materials from which lightweight wheels are usually made.

The present invention provides for the positive attachment of balance weights to the inner portion or portions of a vehicle wheel rim, and at any required location circumferentially of the rim. Securing, removal and shifting of the weights with respect to the rim in the obtaining of wheel balance can be accomplished in a relatively easy and rapid manner. The positive attachment of a balance weight to the interior of the rim at a desired location prevents its loss under high speed and other driving conditions, and also under conditions of high temperature operations. Wheels of the type described herein, and which are not susceptible to the positive attachment of balance weights to the inner portions of the wheel rim, are modifiable through the addition of a rib structure to permit the positive securing of balance weights to such inner portions and at substantially any and all positions circumferentially around the wheel rim. The attachmet of the balance weights to the inner portions of the wheel rim enables the latter to resist the action of centrifugal forces that tend to cause the weights to fly outwardly.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed decription is not to be taken in a limiting sense.

Referring to the drawings:

FIG. 8 is a view similar to FIG. 6 illustrating another form of the invention;

FIG. 9 is a view similar to FIG. 6 illustrating yet a further embodiment of the invention;

FIG. 10 is a view similar to FIG. 6 disclosing yet another embodiment of the invention;

FIG. 11 is a view similar to FIG. 6 disclosing an additional embodiment of the invention;

FIG. 12 is a view corresponding to FIG. 6 showing yet a further form of the invention;

FIG. 13 is a view similar to FIG. 6 disclosing yet an additional embodiment of the invention;

FIG. 14 is a view similar to FIG. 6 illustrating another form of the invention.

Figure 1:
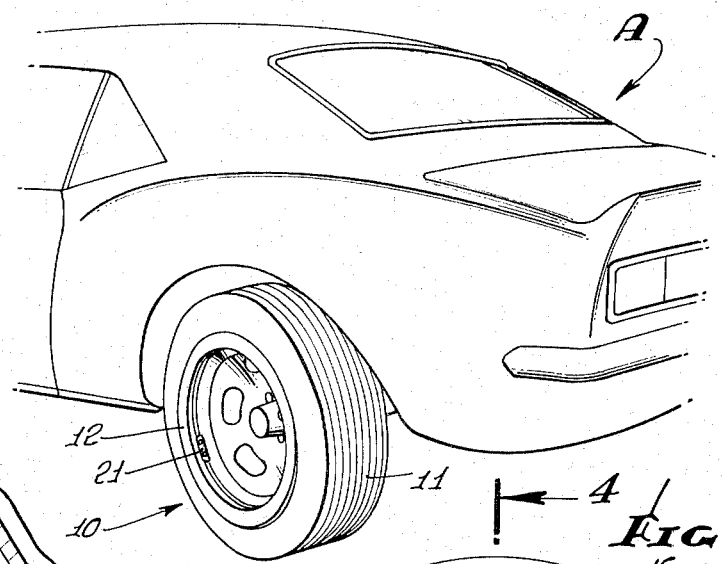
FIG. 1 is an isometric projection of a portion of a vehicle, illustrating a wheel and pneumatic tire mounted on such wheel.

As disclosed in FIG. 1, an automotive vehicle A includes a wheel 10 suitaby mounted thereon, and with a pneumatic tire 11 mounted on the wheel rim 12. The particular wheel illustrated is used on vehicles operable at relatively high speeds, such as racing automobiles. Such wheels are made of lightweight materials, including magnesium or aluminum. It is highly desirable for such wheels, with the tire mounted thereon, to be balanced properly, both statically and dynamically.

Figure 2:
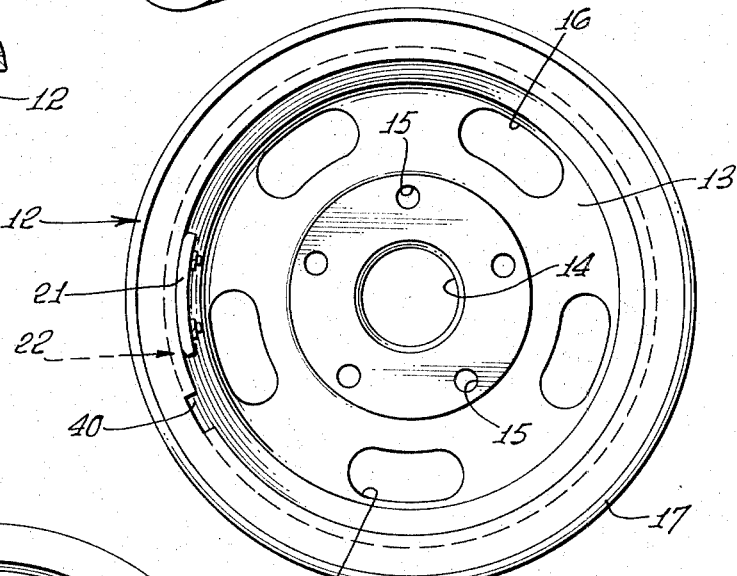
FIG. 2 is an outer side view of the vehicle wheel illustrated in FIG. 1, and on an enlarged scale.
Figure 3:
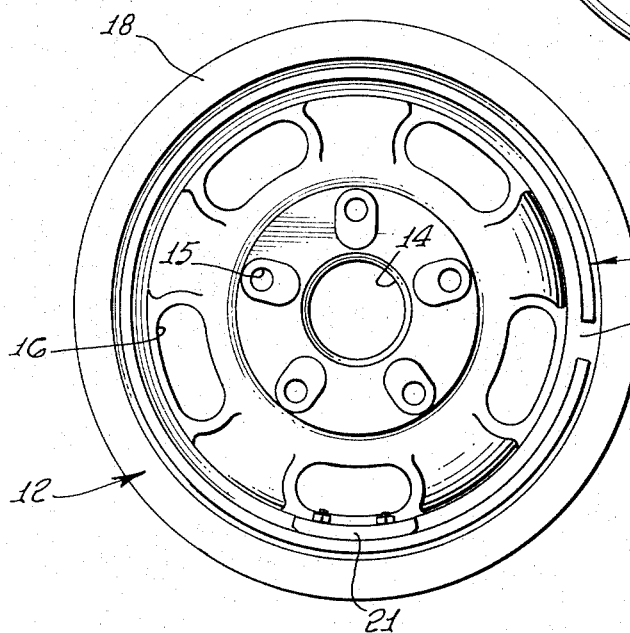
FIG. 3 is an inner side view of the vehicle wheel of FIG. 2.
Figure 4:
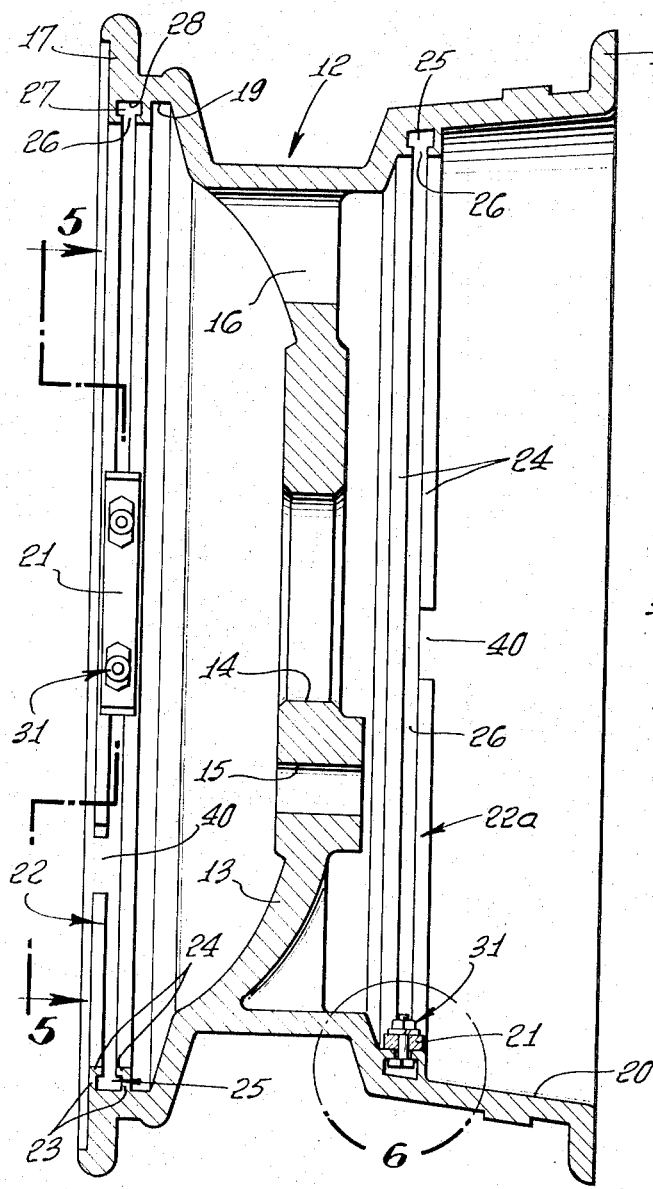
FIG. 4 is an enlarged vertical section taken along the line 4—4 on FIG. 2.

A vehicle wheel of the type just referred to is illustrated more particularly in FIGS. 2 to 4 of the drawings. It includes a main or central body portion 13 suitably mounted at the front or rear of the vehicle and having a central aperture 14 and circumferentially spaced holes 15 therethrough through which lugs, or the like, will pass for mounting the wheel on the vehicle, all in a known manner. The central body 13 may also have a plurality of circumferentially spaced apertures 16 to lighten its weight. The central body is integral with the rim 12 on which the pneumatic tire 11 is mounted, this rim having an outwardly extending outboard bead 17 and an outwardly extending inboard bead 18 at its opposite ends. It also includes an inner perimeter 19 of the rim, which is of generally cylindrical shape, disposed at the outboard portion of the wheel rim, and another inner perimeter 20 of the inboard rim portion that may be a substantially cylindrical surface, or one which is slightly tapered and of frusto-conical shape.

For the purpose of balancing the wheel, it may be necessary to apply balance weights 21, which are usually made of lead, to either the outboard or inboard portion of the rim, or to both portions, each balance member being of the required weight. To secure the weights to the inner portion of the rims, an inner rib 22 is provided on the outboard portion of the rim, which is integral therewith, and which extends circumferentially therearound and radially inwardly of the inner perimeter 19 of the rim. This rib includes opposed sides 23 integral with flanges 24 that face toward each other, forming a T-shaped groove 25. The leg portion 26 of the groove is a slot, permitting entry into the wider head portion 27 of the groove, defined between the flanges 24, sides 23 and base 28 of the groove, the groove extending circumferentially around the inner perimeter 19 of the rim 12.

Figure 5:
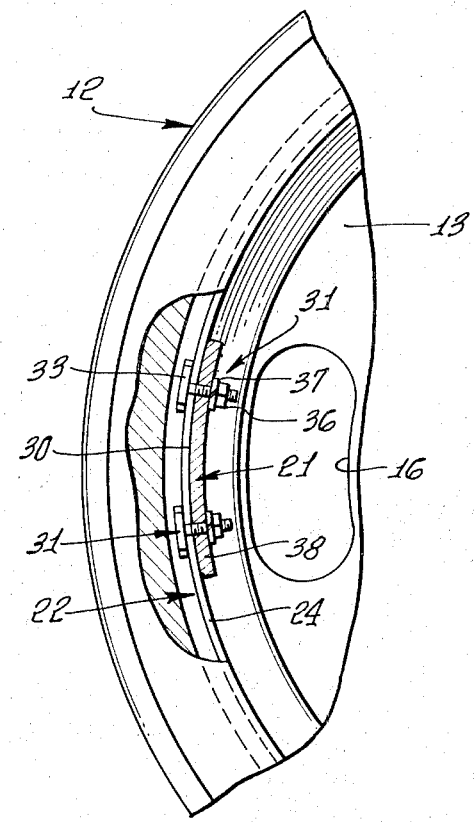
FIG. 5 is a fragmentary side elevational view, a part shown in section, taken along the line 5—5 on FIG. 4.

One or more balance members 21, each of a suitable weight, is to be mounted on the rib 22 and firmly secured thereto. Each balance weight 21 (FIG. 5) has its outer surface 30 curved to conform to the circular curvature of the flanges 24 against which the weight will bear. The weight is firmly attached to the rib by one or a plurality of threaded fastening elements 31, which, as disclosed, each includes a bolt, the head 33 of which is located within the wide portion 27 of the T-shaped groove and adapted to bear against the opposed flanges 24, the shank 34 of the bolt projecting through the rib slot 26 and through a hole 35 in the weight. A nut 36 is threaded on the shank of the bolt, bearing against a lock washer 37 which engages the inner surface 38 of the weight. Tightening of the nut 36 will cause the bolt head 33 to firmly engage the inner surfaces of the flanges 24, and the outer curved surface 30 of the weight to bear firmly against the rib flanges 24, the lock washer 37 preventing loosening of the nut 36 and of the bolt. It is to be noted that the slot 26 has a width slightly greater than the diameter of the bolt shank 34, and that the head 33 of the bolt extends laterally from both sides of the shank and overlaps the flanges 24 substantially to have a large area bearing thereagainst when the nut 36 is tightened.

Access of the bolt into the T-shaped groove 25 is provided through a recess or opening 40 through one side 23 of the rib 22 and its associated flange 24, so that the bolt head 33 and shank 34 can be slipped axially through the opening 40 to place the head within the wide portion 27 of the T-shaped groove, and the shank 34 in the slot 26, whereupon the bolt 31 is shiftable circumferentially around the rib 22 to the position at which the balance member 21 of the desired weight is to be secured to the rib.

Figure 6:
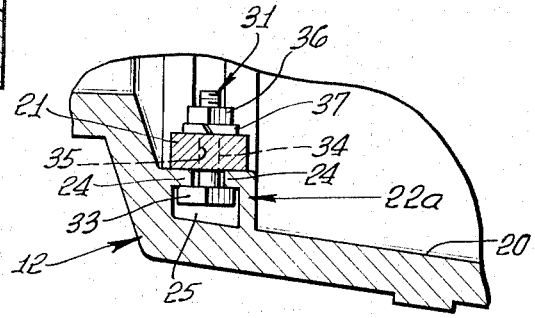
FIG. 6 is an enlarged fragmentary section taken at the place on FIG. 4 indicated by the circle 6.

As illustrated more particularly in FIGS. 4 and 6, a circumferential inboard rib 22a may also be provided, which is integral with the rim 12 and projects inwardly of its inner perimeter 20. This rib is of the same general shape as the outboard rib 22, having the opposed sides 23 and flanges 24, as well as an access opening 40. Each balance member 21 of a required weight may be firmly clamped against the inner surface of the rib by one or a plurality of bolts 31, the heads 33 of which are located within the wide portion 27 of the T-shaped groove or channel 25, the bolt shank 34 extending through the slot 26 and the weight 21 clamped to the rib through the agency of the nuts 36 and intervening lock washers 37.

Through use of known wheel balancing equipment, one or more weights 21 may be secured to one or to both ribs 22, 22a to achieve static and dynamic balance of the wheel. The bolts 31 positively attach the weight or weights to the ribs and will not loosen under high speed driving conditions. Centrifugal force is resisted by the fact that each balance member 21 is urged outwardly against a very ample surface provided by the large bearing area between the curved outer surface 30 of the weight and the curved companion rib surfaces contacted thereby. Thus, the weights cannot loosen from the rib and will not fly off under the action of centrifugal force. Moreover, they will remain positively secured to the rib despite being subjected to vibration and comparatively high temperatures.

Figure 7:
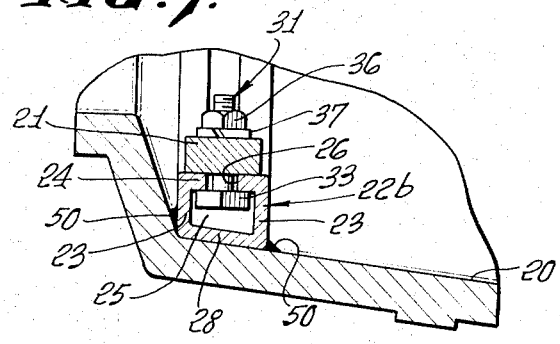
FIG. 7 is a view similar to FIG. 6 illustrating a modified form of the invention.

The form of invention illustrated in FIG. 7 is substantially the same as shown in FIG. 6. In this embodiment, the circumferentially continuous rib 22b is not integral initially with the rim 12. However, it is formed with a base 28, spaced sides 23 and flanges 24 directed toward each other, being placed against the inner periphery 20 of the rim and suitably secured thereto, as by tack welds 50. Although not disclosed in FIG. 7, an access opening 40 is also provided in one of the sides and flanges 23, 24 to permit introduction of the bolts 31 into the T-shaped channels 25, the lead balance members 21 being attached to the rib in the same manner as described above in connection with FIGS. 4, 5, and 6.

The embodiment of invention illustrated in FIG. 8 is similar to the one illustrated in FIG. 6. The difference resides in the fact that the sides 23 of the rib 22c are curved to provide a channel 27a circular in cross-section communicating with the slot 26, the sides 23a and flanges 24a having exterior curves to accept balance members or weights 21a having their outer surfaces 30a concave to conform to the convex sides of the flanges 24a. The head 33a of the bolt 31a is illustrated as being circular in cross-section to conform to the inner wall of the channel 27a, whereby tightening of the nut or nuts 36 will clamp the weight 21a against the exterior of the rib 22c and the intervening lock washer 37.

In the form of invention disclosed in FIG. 8, not only will the outer surface of the rib 22c resist centrifugal force tending to displace each balance weight, but the coengaging curved surfaces of the rib and weight will resist axial displacement of the weight 21a under driving conditions.

As in connection with FIG. 6, one side 23a and flange 24a of the rib 22c will have an access opening 40 (not shown in FIG. 8) provided therein, to permit introduction of the bolt head 33a and its shank 34 into the T-shaped channel.

The embodiment of invention illustrated in FIG. 9 is essentially the same as disclosed in FIG. 8, except that the rib 22d is formed initially separate from the rim 12, the rib being secured to the rim, as by means of the tack welds 50. In all other respects, the coaction between the bolt 31a, weight 21a and lock washer 37 with the rib 22d is the same as illustrated in FIG. 8. The arrangement of FIG. 9 can be applied to an existing wheel rim that does not have a rib for the reception of weights, by the simple expedient of attaching the circumferentially continuous rib 22d to the inner periphery 20 of the rim, as through use of the tack welds.

The form of invention disclosed in FIG. 10 is essentially the same as disclosed in FIG. 7. The rib 22e is a circumferentially continuous member initially separate from the wheel rim, being placed at the desired location against its inner periphery 20 to which it is suitably secured by spot welds 50 affixing the outwardly directed flanges 100 to the rim. The rib 22e also has the sides 23 and inwardly directed flanges 24 forming the T-shaped channel or groove 25 with the inner perimeter 20 of the rim.

The flanges 24 are integrated to one another at spaced intervals 26a around the circumference of the rib, there being intervening slot portions 26 through which the bolts 31 will extend, there being access openings 40a through the sides and flanges 23, 24 at one side of the rib through which the bolts can be inserted into the rib. Balance members 21b, which may be of the shape illustrated in FIG. 10, are clamped through the agency of the bolts 31 against the rib. As specifically disclosed, a wing nut 36a is threaded on the shank 34 of the bolt to tighten a spring retaining washer 37a against the weight 21b to force and hold it against the surface of the rib flanges 24.

In the form of invention shown in FIG. 11, the rib 22f has a circumferentially continuous groove 60 formed therein adapted to receive a lead weight 21c, or other balancing member, shaped to conform to the groove. The weight is shifted circumferentially to the desired position within the groove or channel 60 and a threaded fastening element 31a, such as a lock screw, is threaded in a companion threaded hole 61 in the outer side 23b and clamped against the weight to retain it in place. The threaded holes 61 to receive the lock screws 31a may be provided at suitable intervals around the side 23b of the rib, to permit location of one or more balance weights at any required point or points around the wheel rim 12.

In the form of invention disclosed in FIG. 12, a circumferential rib 22g is provided, generally T-shape in cross-section, the outwardly directed leg 70 of the T being secured to the inner surface 20 of the rim 12 by tack welds 50. The inner portion of the T-shaped rib 22g consists of arms 71 extending axially in opposite directions with respect to the leg 70. One or more balance weights 21d can be secured to the rib at the required circumferential location or locations. Each balance weight, which is curved to conform to the curvature of the T-shaped rib 22g, has an inner base 72 integral with sides 73 projecting radially outwardly and merging into flanges 74 that project inwardly toward each other to provide a space with the base 72 of sufficient width as to accommodate the rib arms 71. The rib material is absent or removed along a portion of its circumference to permit each lead weight 21d to be slipped over the T-shaped arms 71, as disclosed in FIG. 12, and placed in a required location, after which the weight is secured to the rib by one or a plurality of lock screws 31a threaded through threaded holes 61 in the base 72 of the balance member and bearing against the rib 22g to clamp the weight thereto.

In the form of invention illustrated in FIG. 13, a circumferentially continuous rib 22h extends axially from an inner lateral flange portion 80 of the rim 12 and in spaced relation to the inner perimeter 20 of the rim. This rib has circumferentially spaced slots 26 therethrough, spaced from each other by short distances, each slot having an access opening 40b for the insertion of a bolt 31 therethrough so that the head 33 of the bolt overlaps the outer surface 81 of the rib on opposite sides of the slot 26, the lead weight member 21 bearing against the inner surface of the rib. The weight is clamped to such inner surface of the rib by a nut 36 threaded on the bolt shank 34 that extends through the slot 26 and weight, the nut being tightened against an intervening lock washer 37 engaging the inner surface of the weight, forcing it against the inner surface of the rib 22h and pulling the head 33 of the bolt firmly against the outer surface 81 of the rib.

In the form of invention disclosed in FIG. 14, a circumferentially continuous radial rib 22k is integral with the rim 12 and extends in an inward direction. A U-shaped weight member 21f is mounted at the desired location over the rib and is clamped thereto at such location by one or a plurality of lock screws 31a threaded through a companion threaded bore 61 in one of the arms 90 of the weight member, with the lock screw bearing against one surface of the rib, firmly forcing the other arm 91 of the weight against the other side of the rib.

Figure 15:
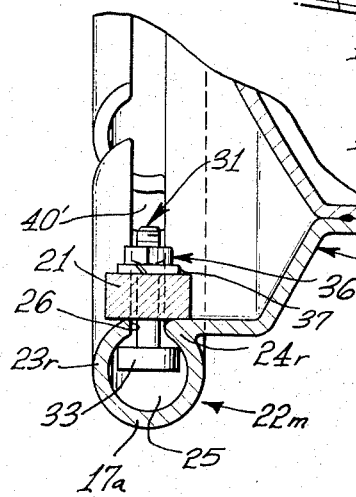
FIG. 15 is a fragmentary section through still another specific embodiment of the invention.

In the embodiment of invention illustrated in FIG. 15, the rib structure 22m is formed in the outer portion of the rim of a stamped and rolled wheel, the rib being constituted by rolling or curling an outboard bead 17a from the rim of a sheet metal disc wheel, the inner flange 24r merging into an inner arm 23r which, in turn, merges into a base from which the outer arm 23r is rolled toward the axis of the wheel, this outer arm merging into an inwardly directed flange 24r opposite the inner flange 24r, thereby forming the T-shaped groove 25 in the rib, the leg portion 26 of the groove being defined between the spaced-apart flanges 24r. As in connection with the form of invention illustrated in FIGS. 4 and 5, one or more balance members 21 are mounted on the rib, bearing against the inner surface of the arms 24r, against which they are secured by the bolt or bolts 31, the head 33 of the bolt being disposed within the groove 25 and bearing against the flanges 24 r, the bolts extending through each balance weight, clamping the latter against the flanges 24r by threading the nut 36 on the shank of each bolt with an intervening lock washer 37 engaging the weight to firmly force it against the flanges 24r. An opening 40' in the outer arm 23r and flange 24r permits insertion of each bolt into the T-shaped groove 40.

I claim:

1. In a balancing system: a vehicle wheel having a rim portion provided with an internal peripheral surface, a circumferential rib secured to said rim portion and projecting substantially radially of said surface and providing an innermost generally cylindrical inner surface; a balancing weight circumferentially adjustably mounted on said rib interiorly of said peripheral surface and bearing against the innermost circumferential cylindrical surface of said rib; and means extending radially through said weight securing said weight to said rib forcing and clamping said weight radially outwardly against said innermost circumferential cylindrical surface of said rib, whereby centrifugal force urges said weight radially outwardly firmly against said innermost circumferential surface.

2. In a balancing system as defined in claim 1; said securing means including a fastening member engaging said rib and passing through said weight.

3. In a balancing system as defined in claim 1; said rib having a groove extending circumferentially therearound; said securing means including a fastening member in said groove projecting from said rib and extending radially inwardly therefrom and through said weight to force said weight radially outwardly against said innermost circumferential surface of said rib and firmly secure said weight against said innermost circumferential surface.

4. In a balancing system as defined in claim 1; said rib having a groove extending circumferentially therearound; said securing means including a fastening member in said groove projecting from said rib and extending radially inwardly therefrom and through said weight to force said weight radially outwardly against said innermost circumferential surface of said rib and firmly secure said weight against said innermost circumferential surface; a side of said rib having a lateral access opening communicating with said groove for insertion of said fastening member thereinto.

5. In a balancing system as defined in claim 1; said rib having a groove extending circumferentially therearound, said groove being of substantially T-shape in cross-section and opening radially inwardly through said rib; said securing means including a fastening member circumferentially shiftable in said groove and projecting through said T-shaped opening from said rib in a radial inward direction, said fastening member extending through said weight to force said weight radially outwardly against said innermost circumferential surface of said rib and firmly secure said weight against said innermost circumferential surface.

6. In a balancing system as defined in claim 1; said rib having a groove extending circumferentially therearound, said groove being of substantially T-shape in cross-section and opening radially inwardly through said rib; and securing means including a bolt circumferentially shiftable in said groove and having a head in said groove and a threaded shank extending radially inwardly from said head through said T-shape groove and projecting from said rib, said shank extending through said weight, and threaded means on said shank bearing against the inner surface of said weight to force said weight radially outwardly against said innermost surface of said rib and said head against said rib within said groove to firmly secure said weight against said innermost circumferential surface.

7. In a balancing system as defined in claim 1; one of said balance weight and said rib having a groove receiving the other of said balance weight and rib, whereby said weight is circumferentially adjustable along said rib.

8. In a balancing system as defined in claim 1, said rib having a groove extending circumferentially therearound, said groove being of substantially T-shape in cross-section and opening radially inwardly through said rib; said securing means including a bolt circumferentially shiftable in said groove and having a head in said groove and a threaded shank extending radially inwardly from said head through said T-shape groove and projecting from said rib, said shank extending through said weight, and threaded means on said shank bearing against the inner surface of said weight to force said weight radially outwardly against said innermost surface of said rib and said head against said rib within said groove to firmly secure said weight against said innermost circumferential surface, a side of said rib having a lateral access opening communicating with said groove for sidewise insertion of said head and shank through said opening into said groove.

* * * * *

UNITED STATES PATENT OFFICE
CERTIFICATE OF CORRECTION

Patent No. 3,799,618    Dated March 26, 1974

Inventor(s) Sante Tino Martinoli

It is certified that error appears in the above-identified patent and that said Letters Patent are hereby corrected as shown below:

Column 7, line 28: "and" should read --said--.

Signed and sealed this 1st day of October 1974.

(SEAL)
Attest:

McCOY M. GIBSON JR.
Attesting Officer

C. MARSHALL DANN
Commissioner of Patents